UNITED STATES PATENT OFFICE.

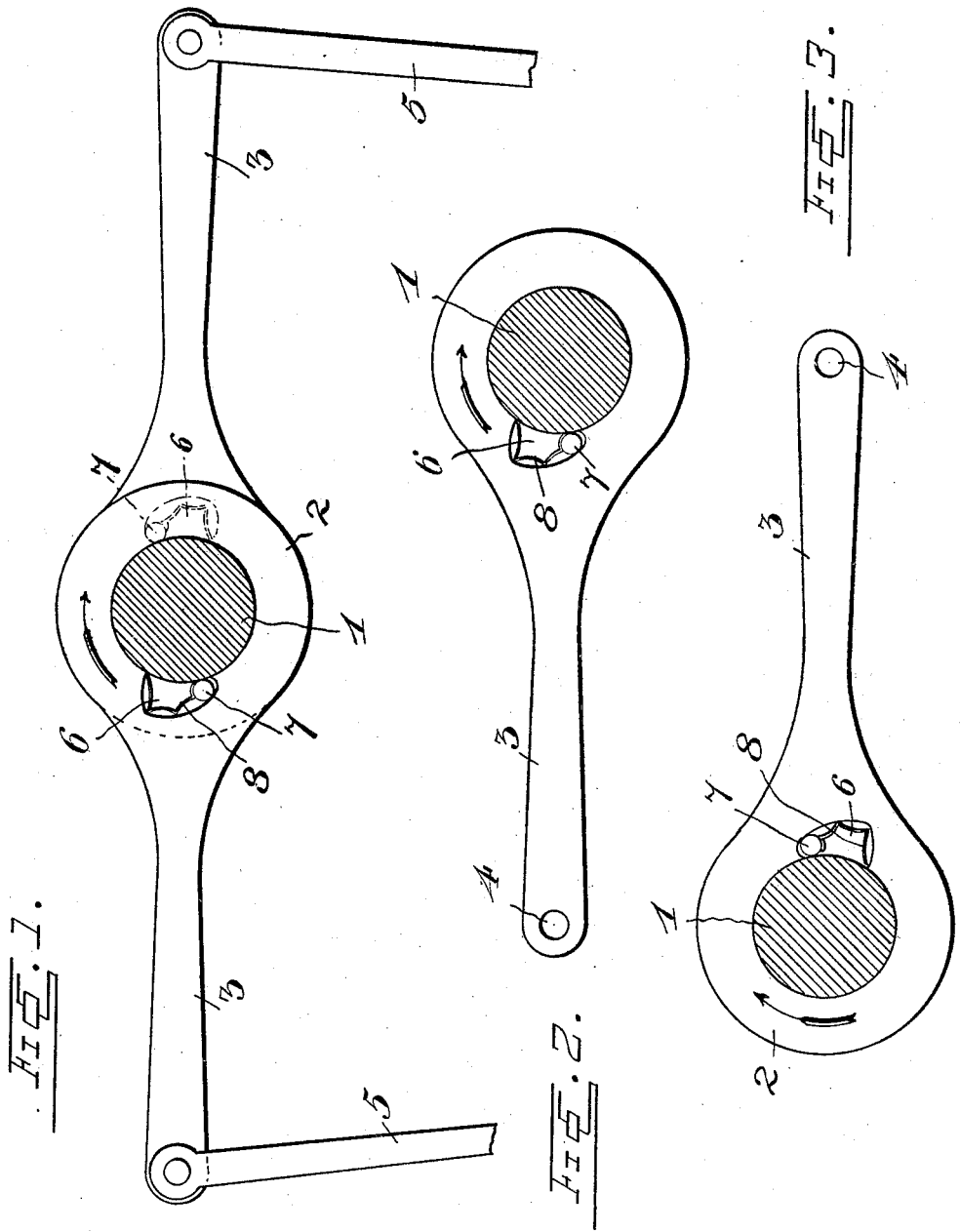

WALLACE W. HEFFRON, OF TOWER CITY, NORTH DAKOTA.

MECHANICAL MOVEMENT.

No. 795,973.  Specification of Letters Patent.  Patented Aug. 1, 1905.

Application filed March 2, 1905. Serial No. 248,119.

*To all whom it may concern:*

Be it known that I, WALLACE W. HEFFRON, a citizen of the United States, residing at Tower City, in the county of Cass and State of North Dakota, have invented certain new and useful Improvements in Mechanical Movements; and I do declare the following to be a full, clear, and exact description of the invention, such as will enable others skilled in the art to which it appertains to make and use the same.

This invention relates to mechanical movements; and one of the principal objects of the same is to provide a reliable and efficient device of comparatively simple construction for converting reciprocating movement into rotary motion.

Another object is to provide means to be operated by a treadle for rotating a shaft, and such mechanism is particularly applicable and desirable for use on sewing-machines or other treadle-operated devices.

These and other objects are attained by means of the construction illustrated in the accompanying drawings, in which—

Figure 1 is a sectional view taken through a shaft and through the devices for rotating the same made in accordance with my invention. Fig. 2 is a side view and partial section of one of the friction-cranks, and Fig. 3 is a similar view of the other friction-crank embodying my invention.

Referring to the drawings for a more particular description of the invention, the numeral 1 designates a shaft which may be journaled in any suitable manner and which is to be rotated in the direction indicated by the arrow shown in the drawings. My invention comprises two friction crank-arms which are applied to the shaft and simultaneously reciprocated, one of the friction crank-arms engaging the shaft during the upper stroke and the other friction-arm engaging said shaft during the downward stroke, thus avoiding the dead-center. These friction crank-arms each consists of a ring or annulus 2, fitted to the shaft 1 with just sufficient freedom to move easily thereon, and an arm 3, extending from said ring or annulus 2 and provided with a perforation 4 at its outer end to accommodate a pitman or connecting-rod 5. A recess 6 is formed in the ring 2, said recess extending inward from its interior wall in line with the arm 3. The recess 6 is of cam formation— that is to say, one end of the recess is of greater area than the other, the arm at the left of the shaft having its recess larger at the top and smaller at the bottom, while the arm at the right of said shaft has the smaller portion of the recess uppermost. The two arms are exact counterparts or duplicates, one of said arms being merely inverted upon the shaft 1, so as to oppositely dispose the two recesses for a purpose which will presently appear. Placed within the recess 6 is a roller 7, and a spring 8 bears upon the roller with just sufficient force to hold said roller in contact with the shaft 1 when the arm 3 is moved in the direction of rotation of said shaft. When said arm is moved in the opposite direction, the roller does not bear with any force against the shaft, and the latter is thus permitted to slip within the ring.

The operation of my invention will be understood from the foregoing and may be described as follows: When the pitmen 5 are moved in an upward direction, the roller 7 at the left of the shaft engages said shaft by friction and rotates it in the direction of the arrow, the roller at the right of said shaft taking hold immediately at the commencement of the downward stroke, as will be understood.

Various changes in the form, proportion, and the minor details of construction may be resorted to without departing from the principle or sacrificing any of the advantages of this invention.

Having thus described my invention, what I claim as new, and desire to secure by Letters Patent, is—

A mechanical movement comprising a pair of friction crank-arms each provided with a ring or annulus to surround a shaft, said rings each having a cam-recess therein adjacent to the crank-arm, and a roller in each recess, a spring seated in each recess and bearing upon the roller, said rollers being arranged to bear upon opposite sides of said shaft, and the cam-recesses being oppositely disposed, substantially as described.

In testimony whereof I have hereunto set my hand in presence of two subscribing witnesses.

WALLACE W. HEFFRON.

Witnesses:
S. F. SHERMAN,
P. R. SHERMAN.